Figure 1:
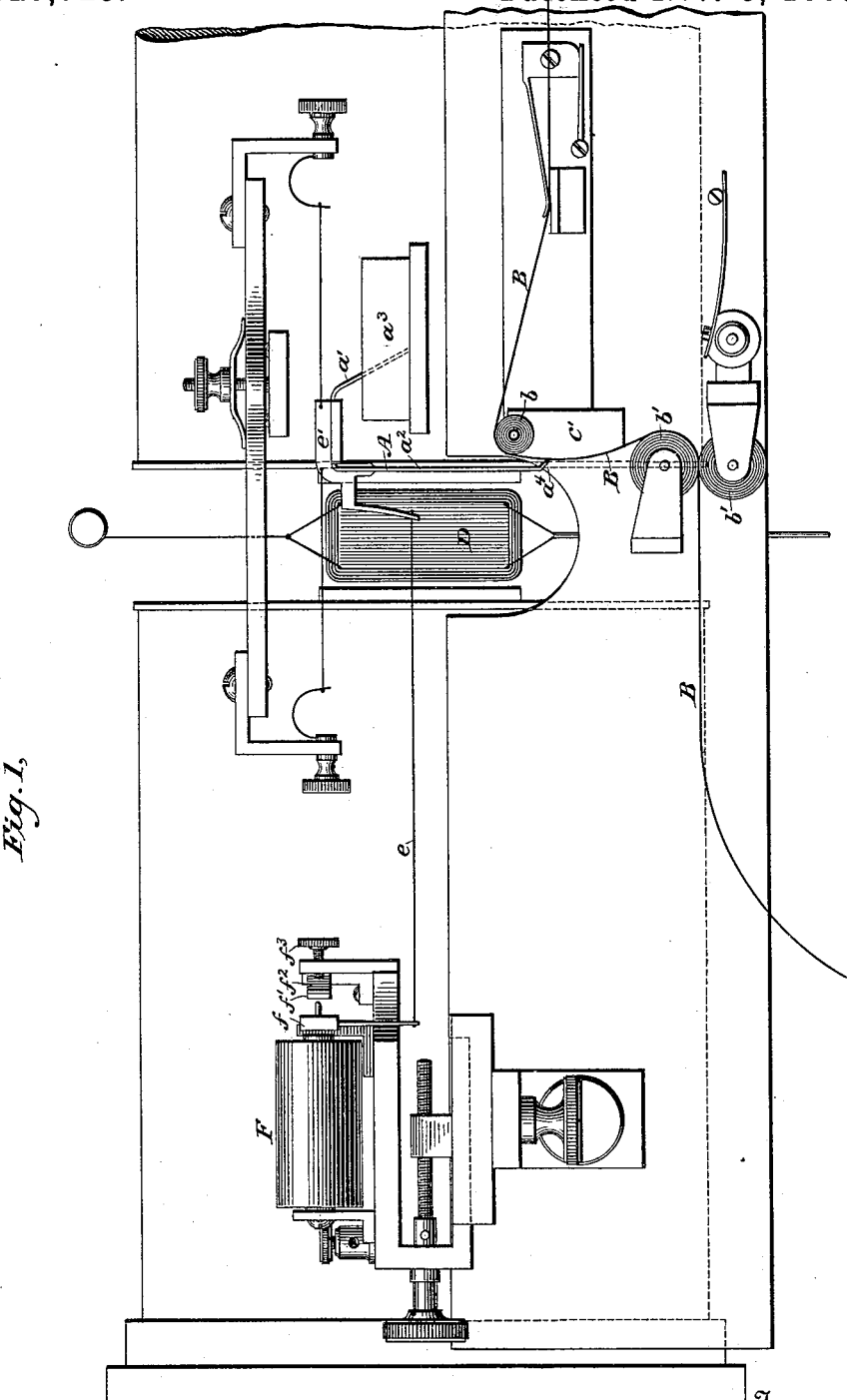

(No Model.) 2 Sheets—Sheet 1.

W. DICKENSON.
SIPHON RECORDING INSTRUMENT FOR CABLES.

No. 329,723. Patented Nov. 3, 1885.

Witnesses
Geo. W. Breck.
Carrie E. Ashley

Inventor
William Dickenson,
By his Attorneys
Pope & Edgecomb

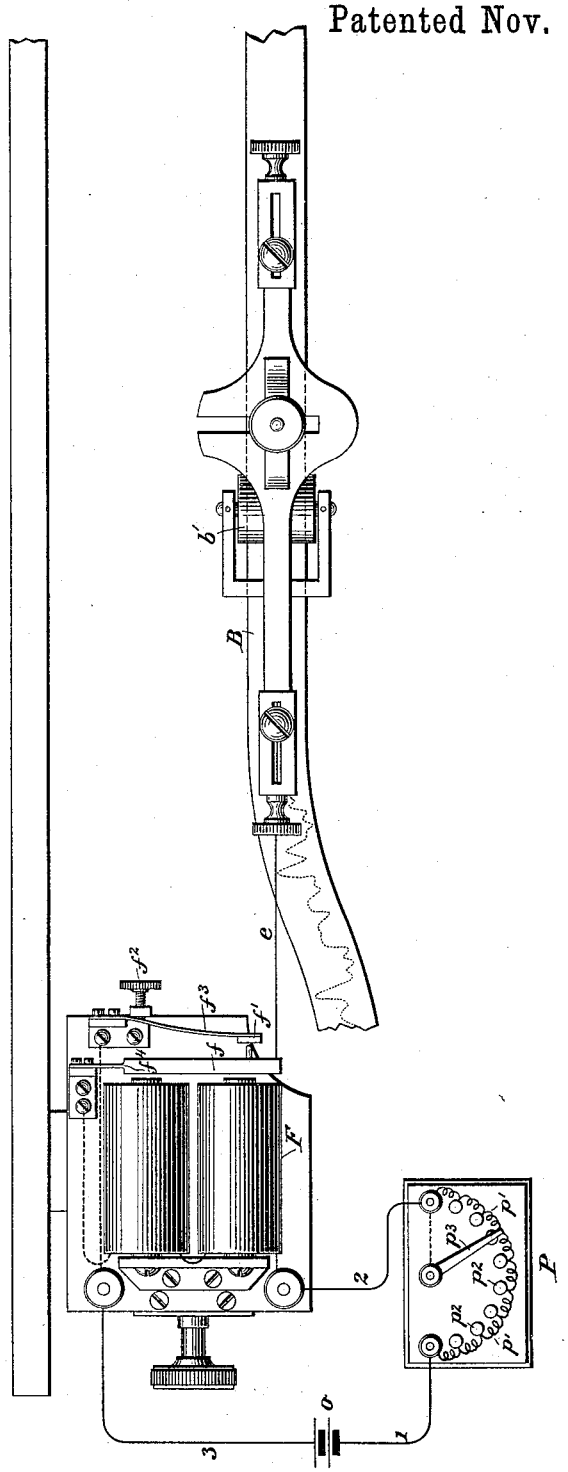

UNITED STATES PATENT OFFICE.

WILLIAM DICKENSON, OF HEART'S CONTENT, NEWFOUNDLAND.

SIPHON RECORDING-INSTRUMENT FOR CABLES.

SPECIFICATION forming part of Letters Patent No. 329,723, dated November 3, 1885.

Application filed August 15, 1885. Serial No. 174,520. (No model.)

*To all whom it may concern:*

Be it known that I, WILLIAM DICKENSON, a subject of the Queen of Great Britain, residing in Heart's Content, Newfoundland, have invented certain new and useful Improvements in Siphon Recording-Instruments for Cables, of which the following is a specification.

My invention relates to certain improvements in the organization of apparatus for recording signals transmitted by electricity over telegraphic circuits of great length, especially ocean-cables.

The object of the invention is to provide a simple and efficient means for producing a continuous record of the movements of the receiving-instrument, which is preferably a coil of wire freely suspended in a powerful magnetic field.

It has heretofore been usual to insure the frictional flow of the ink from a tubular or siphon pen receiving its movements from said coil to a moving band of paper by means of electrical attraction.

The present invention constitutes an improvement on this apparatus; and it consists, essentially, in the application to the ink duct or siphon of mechanism for imparting thereto a continuous mechanical vibration, and to thus insure a uniform delivery of the ink without permitting the pen to touch the paper. In this manner the record, consisting of a continuous trace or dotted line, will be made without any friction between the recording-point and the paper upon which the record is made. For the purpose of imparting the vibration to the recording point or duct, an electro-magnet having an armature capable of continuous and rapid automatic vibration is employed. This armature is connected by a suitable mechanical means, preferably a flexible thread, with the cradle which carries the recording point or duct, and its continued vibration imparts the necessary movement to the point toward and away from the paper. The record will therefore be made by a series of very small dots, forming a continuous line or trace, the undulations of which indicate the signals.

In the accompanying drawings, which illustrate the invention, Figure 1 is a side elevation of the apparatus, and Fig. 2 is a plan view of the same.

Referring to the figures, A represents the tubular recording pen or siphon. One arm, $a'$, of the siphon is immersed in an ink-reservoir, $a^3$. The ink is drawn downward through the longer arm, $a^2$, of the siphon, and being ejected therefrom produces a record upon the strip or ribbon of paper B, which is made to pass over a suitable anvil, $c'$, opposite the marking-point by means of moving rollers $b'$ $b'$ $b'$ in any convenient manner. The lateral movements of the recording-point whereby the different signals are indicated are occasioned by means of a galvanometer or signal coil, D, suspended within a powerful magnetic field. This portion of the apparatus is of the ordinary construction, and need not herein be specifically described. The siphon A is mounted in a swinging cradle, $e'$, and to this there is attached a thread or cord or small thin wire or other convenient and suitable medium leading to an armature-lever, $f$, of an electro-magnet, F. The armature-lever is designed to be vibrated rapidly and continuously toward and away from the paper by the alternating magnetization and demagnetization of the electro-magnet produced by currents from a local battery, $o$. To this end one pole of the battery is connected by conductors 1 and 2 through the coils of the magnet with the armature-lever, while the other pole is connected by a conductor, 3, with a yielding adjustable contact-point, $f'$. A thumb-screw, $f^2$, is employed for adjusting the position of the spring $f^3$, carrying this contact. When the armature-lever is drawn away from its electro-magnet by its spring $f^4$, the connections of the battery are complete through the electro-magnet, and immediately the armature is drawn forward. The connections of the battery are thereupon severed, and the armature is again forced away from the electro-magnet. This operation is repeated and a continuous and rapid vibration of the armature is secured. These vibrations are communicated to the longer arm, $a^2$, of the siphon through the connecting cord or wire $e$. The recording-point $a^4$ of the siphon is thus vibrated very rapidly from and toward the surface of the paper slip B upon which the record is being made. This causes a small globule of ink to be ejected at each vibration, and thus produces a continuous succession of dots, placed in such proximity to each other upon the paper as to appear as a practically continuous line. The lateral movements of the marking-point produced by the right and left deflections of the galvanometer-coil forms the undulations in the continuous line, which constitute signals intelligible to persons skilled in the art. The recorded message, however, will be more perfect and distinct by reason of the increased and perfectly uniform flow given to the ink by the rapid vibration and tapping of the recording-point.

For the purpose of modifying the operation of the vibrator, it is often convenient to increase or decrease the amount of resistance included in the circuit of the battery $o$. For this reason there is preferably included in the conductor 1 an adjustable artificial resistance, P. This consists of a series of small resistance-coils or other forms of artificial resistance, $p'$ $p'$, &c., connected in series and alternating with a corresponding series of contact-points, $p^2 p^2$, &c. The conductor 1 leads to one of the series, and the conductor 2 from the other end. A switch-arm, $p^3$, is connected with the conductor 2, leading to the electro-magnet, and by means of this switch any number of the sections $p'$ of resistance may be shunted, a circuit being afforded by placing it against any one of the contact-points, through that point, the arm and the conductor leading to the conductor 2.

The invention is applicable not only to a siphon-recorder of the character indicated, but to any form of recording-instrument in which a marking-point is placed against a moving strip of paper.

I claim as my invention—

1. The combination, substantially as hereinbefore set forth, with the marking-point of a recording-instrument, of a vibrating arm and a mechanical connection between said vibrating arm and said recording-instrument.

2. The combination, substantially as hereinbefore set forth, with a siphon-recorder, of a rheotome and a mechanical connection between said rheotome and recorder, substantially as and for the purposes specified.

3. The combination, substantially as hereinbefore set forth, with the marking-point of a siphon-recorder, of an electro-magnet, its armature, a circuit for said electro-magnet, the connections of which are automatically made and interrupted by the to-and-fro movement of said armature, and a mechanical connection, substantially such as described, between said armature and siphon, whereby the latter is vibrated.

4. The combination, substantially as hereinbefore set forth, with a marking-point and means for moving the same laterally, of a rapidly-vibrating arm, and a connection between said arm and marking-point, substantially such as described, whereby the vibrations of said marking-point are in a plane at right angles to its lateral movement.

In testimony whereof I have hereunto subscribed my name this 26th day of June, A. D. 1885.

WILLIAM DICKENSON.

Witnesses:
JNO. WADDELL,
WM. S. CANNING.